May 21, 1940.  E. O. SHREFFLER ET AL  2,201,838
CLUTCH ATTACHMENT
Filed July 26, 1939
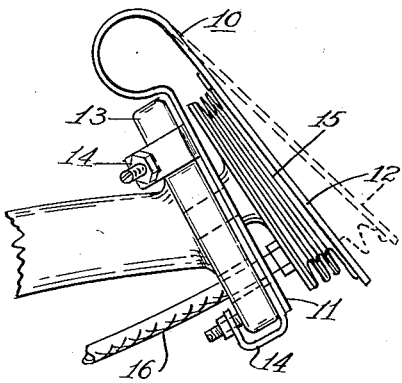
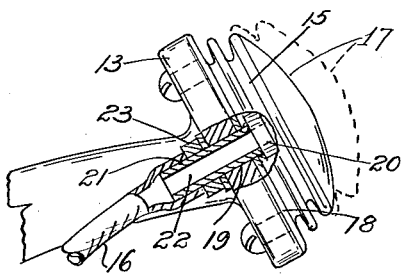
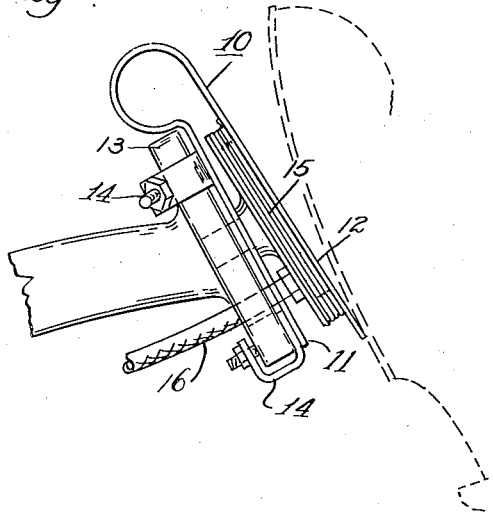
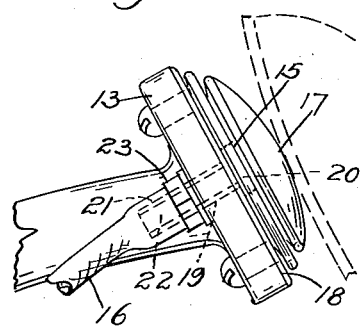
Inventors
Elwyne O. Shreffler
and Aaron D. LeSage
by James R. McKnight
their Attorney Patented May 21, 1940

2,201,838

UNITED STATES PATENT OFFICE 2,201,838

CLUTCH ATTACHMENT

Elwyne O. Shreffler and Aaron D. Lesage, Manteno, Ill.

Application July 26, 1939, Serial No. 286,532

5 Claims. (Cl. 192—99)

Our invention relates to a device adapted to be attached to the clutch pedal of an automobile.

It is well known that the clutch of an automobile becomes worn with wear, and that the distance of travel of the clutch pedal decreases with wear. Frequently when a clutch is new there is as much as 1½ inches of travel by the clutch pedal to release the clutch. The distance of travel decreases with wear until often there is but ⅛ of an inch. When it is remembered that thirty pounds of pressure is normally applied to the clutch pedal it will be noted that such pressure will actuate the clutch faster at ⅛ of an inch of travel than it would at 1½ inches. This often results in the clutch taking hold too suddenly with consequent faulty operation.

It is among the objects of our invention to provide an attachment to the pedal of a used clutch to increase the length of travel so that it remains constant. Our attachment permits the pedal to have and maintain substantially the same movement that it had when comparatively new.

Another object of our invention is to provide an attachment eliminating complicated parts and which can be quickly and simply attached to any clutch pedal, and which is economical of manufacture, efficient in operation and lasting of wear, and such other objects, advantages and capabilities as will later more fully appear and which are inherently possessed by our invention.

While we have shown in the accompanying drawing a preferred form of our invention yet we desire it understood that the same is susceptible of modification and change without departing from the spirit of our invention.

Referring to the drawing, Figs. 1 and 3 are side elevational views of one preferred embodiment of our clutch attachment in different positions of operation and Figs. 2 and 4 are similar views of another embodiment of our invention.

The embodiments selected to illustrate our invention comprise a metallic body member 10 having a substantially flat lower portion 11 and bent downwardly, outwardly and upwardly to form an inclined upper or foot pressure receiving portion 12 normally spaced from the lower portion 11. The lower portion 11 is attached to the pedal 13 of an automobile by suitable clamping means 14 or the like.

As shown in Fig. 1 a diaphragm of air tight chamber 15 is attached to the under portion of the upper portion 12. This diaphragm is made of rubber or other flexible material and is directly connected by tubing 16 to the intake manifold of the internal combustion engine. When the motor is started the vacuum from the intake manifold sucks air out of chamber 15 and depresses the top portion 12 so as to bring the top portion 12 closer to the bottom portion 11. Foot pressure is then applied to top portion 12 to bring it against bottom portion 11 to release the clutch. As the clutch engages the motor slows down and the change of pressure in the intake manifold allows the upper portion 12 to move upwardly from the lower portion 11. The spread between upper portion 12 and lower portion 11 is in proportion to the load on the motor and the pressure created thereby in the intake manifold.

This diaphragm structure is automatic and co-operates with the pressure of the operator's foot to simulate the conditions of operation present in a new clutch.

Another form of our invention as shown in Fig. 2 comprises a compressible airtight diaphragm 15 of rubber or suitable flexible material having a top surface 17 adapted to receive the foot of the driver. The bottom surface 18 of the diaphragm 15 lies against the pedal 13 of the automobile and is attached to said pedal by means of a bolt 19 which has a head 20 positioned within the diaphragm and a shank 21 extending through said pedal 13. The bolt 19 has an aperture 22 extending from the head 20 down through the shank 21. A nut 23 surrounds the shank 21 of the bolt 19 to prevent accidental displacement. A tube 16 surrounds the lower end of the shank 21 and leads to the intake manifold of the automobile.

In operation the driver applies foot pressure to the compressible air tight member 15, attached to the clutch actuating member or pedal 13 of the vehicle. With motor running at near maximum vacuum (as in case of idling) the connection from the manifold to said air tight member attached to the pedal will allow the air to be sucked out of said air tight member and depress its top portion closer to the bottom portion. With added foot pressure against the top portion the device is so proportioned that it will hold out a clutch load in a de-clutch position. As foot pressure is decreased on said member the clutch starts to engage accordingly, the motor tends to slow up causing a change of pressure in the intake manifold and allowing said flexible member to recede in direct proportion to the load of the motor, resulting in a smoother foot range of the clutch actuation with an automatic controlled engagement of the clutch to the speed of the motor, ironing out any irregularities so commonly found in used clutches.

In Figs. 1 and 2 the preferred embodiments of our attachment are shown in dotted lines in normal unoperated position receiving no pressure from the operator's foot and with the internal combustion motor not running. Figs. 1 and 2 show the embodiments in solid lines, in the positions they assume with the motor running but before pressure of the foot is applied by the operator. It will be noted in Fig. 1 that the upper portion 12 is approximately two-thirds nearer the lower portion 11 than it was as shown in dotted lines, and that in Fig. 2 the top surface 17 is likewise two-thirds nearer the bottom surface 18 than it was as shown in dotted lines. This is because the high pressure in the intake manifold has caused the air to be expelled from the diaphragm 15.

Figs. 3 and 4 show the embodiments in Figs. 1 and 2 respectively, in position with pressure applied by the foot of the user so that in Fig. 3 the upper portion 12 is closer to lower portion 11 than it was in Fig. 1, and in Fig. 4 the top surface 17 is nearer to bottom surface 18 than it was in Fig. 2. This positioning is caused by the pressure of the foot of the operator plus the high pressure in the intake manifold, and discloses our structure in that part of the cycle in which the clutch is disengaged. After putting the car in suitable gear the operator gradually releases pressure of his foot on the upper portion 12 or top surface 17 to gradually engage the clutch. During the engagement period the manifold pressure drops proportionately to the load on the motor and air again enters diaphragm 15 to aid in the spreading of distance between upper portion 12 and lower portion 11, as shown in Fig. 1, and upper surface 17 and bottom surface 18 as shown in Fig. 2. In circumstances of where the load is exceptionally heavy on the clutch there is less pressure in the manifold so that the extent of the diaphragm approximates that shown in Figs. 1 and 2.

Having thus described our invention we claim:

1. In combination with the clutch and intake manifold of an automotive vehicle, a metallic body member having a lower portion and an integral resilient upper portion normally spaced from said lower portion, a diaphragm attached to the under portion of said upper portion, a tubing leading from said diaphragm to the intake manifold and means for attaching the lower portion of the body member to the clutch pedal.

2. In combination with the clutch and intake manifold of an automotive vehicle, a body member bent to form a flat lower attachment portion and an upper resilient inclined foot pressure receiving portion normally spaced from said lower portion, an air tight flexible member attached to the under portion of said pressure receiving portion, a tube leading from the flexible member to the intake manifold to communicate pressure from the intake manifold to the flexible member and to raise and lower the pressure receiving portion with relation to the lower attachment portion, and means attached to the lower portion of said attachment portion for attachment to the clutch pedal.

3. In combination with the clutch and intake manifold of an automotive vehicle, a compressible air-tight member having a lower portion attached to the clutch pedal, and an upper portion positioned to receive pressure from the foot of the driver, and an air-tight connection leading from said diaphragm through said clutch pedal to the intake manifold.

4. In combination with the clutch and intake manifold of an automotive vehicle, a compressible air tight member having a lower portion engaging the clutch pedal and an upper portion positioned to receive pressure from the foot of the driver, a bolt having a head forming a seal within said air-tight member and a shank extending through said clutch pedal, a nut surrounding the lower portion of said shank below the clutch pedal, said bolt having an aperture extending from the head within said diaphragm down to and through the shank, and an air-tight tube surrounding the end of the shank and leading to the intake manifold.

5. In combination with the clutch and intake manifold of an automotive vehicle, a compressible air tight member having a lower portion attached to the clutch pedal, and an upper portion positioned to receive pressure from the foot of the driver, and an air tight connection leading from said diaphragm to the intake manifold.

ELWYNE O. SHREFFLER.
AARON D. LESAGE.